US008665080B2

(12) United States Patent
Nagamine et al.

(10) Patent No.: US 8,665,080 B2
(45) Date of Patent: Mar. 4, 2014

(54) DRIVING ASSISTANCE APPARATUS

(75) Inventors: Noboru Nagamine, Anjo (JP); Kazuya Watanabe, Anjo (JP); Koichiro Honda, Nagoya (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 190 days.

(21) Appl. No.: 13/390,466

(22) PCT Filed: Aug. 5, 2010

(86) PCT No.: PCT/JP2010/063268
§ 371 (c)(1),
(2), (4) Date: Feb. 14, 2012

(87) PCT Pub. No.: WO2011/027646
PCT Pub. Date: Mar. 10, 2011

(65) Prior Publication Data
US 2012/0139716 A1    Jun. 7, 2012

(30) Foreign Application Priority Data

Sep. 1, 2009    (JP) .................. 2009-201916

(51) Int. Cl.
| | |
|---|---|
| B60Q 1/00 | (2006.01) |
| B60Q 1/34 | (2006.01) |
| G09F 25/00 | (2006.01) |
| G08G 1/00 | (2006.01) |
| G08G 1/16 | (2006.01) |
| G08G 1/123 | (2006.01) |
| B60Q 1/42 | (2006.01) |
| B62D 6/00 | (2006.01) |
| B60D 1/28 | (2006.01) |
| H04N 7/00 | (2011.01) |
| A01B 69/00 | (2006.01) |
| B60R 22/00 | (2006.01) |

(52) U.S. Cl.
USPC ........... 340/438; 340/435; 340/436; 340/465; 340/286.01; 340/901; 340/903; 340/988; 116/31; 180/6.2; 180/271; 348/113; 701/41; 701/49; 701/301; 701/302; 701/408

(58) Field of Classification Search
None
See application file for complete search history.

(56) References Cited

U.S. PATENT DOCUMENTS 5,450,057 A    9/1995 Watanabe
(Continued)

FOREIGN PATENT DOCUMENTS

JP    6-294866 A    10/1994
JP    08-069283 A    3/1996
(Continued)

OTHER PUBLICATIONS

International Search Report of PCT/JP2010/063268 dated Nov. 2, 2010.
(Continued)

*Primary Examiner* — George Bugg
*Assistant Examiner* — Renee Dorsey
(74) *Attorney, Agent, or Firm* — Sughrue Mion, PLLC

(57) ABSTRACT

Disclosed is a driving assistance apparatus for assisting a driving operation by outputting a reverse sound at the time of a reversing maneuver of a vehicle. The apparatus includes an information acquisition unit for acquiring driving assistance information including a vehicle condition and a vehicle surrounding condition, a reverse sound management unit for managing reverse sounds belonging in a musical scale including the reverse sound as the tonic note thereof as musical scale reverse sounds, an output reverse sound determination unit for determining a sequence of musical scale in the form of temporal sequence corresponding to the driving assistance information, and a reverse sound output control unit configured to select from the reverse sounds managed by the reverse sound management unit and output to a speaker reverse sounds suitable for the sequence of the musical scale determined by the reverse sound determination unit.

5 Claims, 7 Drawing Sheets

(56) References Cited

U.S. PATENT DOCUMENTS

| | | | |
|---|---|---|---|
| 7,786,896 B2* | 8/2010 | Schmid et al. | 340/932.2 |
| 7,916,039 B2* | 3/2011 | Hess et al. | 340/691.1 |
| 2005/0128294 A1* | 6/2005 | Green et al. | 348/148 |
| 2006/0001532 A1* | 1/2006 | Nagata | 340/438 |
| 2009/0248245 A1* | 10/2009 | Sumiya et al. | 701/36 |

FOREIGN PATENT DOCUMENTS

| | | | |
|---|---|---|---|
| JP | 2689792 B2 | 12/1997 |
| JP | 11-208370 A | 8/1999 |
| JP | 2959326 B2 | 10/1999 |
| JP | 2003-306104 A | 10/2003 |
| JP | 2004-094057 A | 3/2004 |
| JP | 3632628 B2 | 3/2005 |
| JP | 4066698 B2 | 3/2008 |

OTHER PUBLICATIONS

English translation of International Preliminary Report on Patentability for PCT/JP2010/063268 dated Mar. 29, 2012.

* cited by examiner

DRIVING ASSISTANCE APPARATUS

CROSS REFERENCE TO RELATED APPLICATIONS

This application is a National Stage of International Application No. PCT/JP2010/063268 filed Aug. 5, 2010, claiming priority based on Japanese Patent Application No. 2009-201916, filed Sep. 1, 2009, the contents of all of which are incorporated herein by reference in their entirety.

TECHNICAL FIELD

The present invention relates to a driving assistance apparatus for assisting a driving operation at the time of a reversing maneuver by reporting driving assistance information including a vehicle condition and a vehicle surrounding condition to a driver through sounds.

BACKGROUND ART

In the field of automobile technology, for its driving assistance system, there are known many techniques for notifying a driver of a change in the surrounding situation of the vehicle by changing the tone of the alert sound. As the most common technique, there is widely employed a technique of changing the frequency, the volume of the alerting sound or the alerting interval in accordance with the distance from an object as an obstacle present in the surrounding of the vehicle or the degree of danger associated therewith, etc.

On the other hand, there is proposed a three-dimensional sound field alerting apparatus configured to alert the position or direction of an object detected as an obstacle present in the surrounding of the vehicle to the driver by changing the sound image of the alert sound (see Patent Document 1 for example). With this apparatus, the sound image of the alerting sound is localized to the direction of the obstacle and also the alerting sound is changed in accordance with the alerting priority, thus guiding or urging the driver to direct his/her line of sight toward the obstacle.

Further, there is also proposed an apparatus configured not only to report the position of the obstacle as described above, but also to provide a driving pathway guidance for the purpose of vehicle parking maneuver assistance (see Patent Document 2). According to the technique employed by this apparatus, when the self vehicle is positioned obliquely relative to a target parking position, the apparatus outputs a sound signal that moves back and forth between base sound image localization positions set on the respective adjacent portions according to the obliqueness, so that a sound image generated by this sound signal may reflect the positional relationship between the self vehicle and the target parking position.

Further, for the purpose of allowing easy recognition even under a noisy circumstance thereby to alleviate psychological stress imposed on the driver during a vehicle driving operation, there is proposed an apparatus configured to notify start and completion of a predetermined operation by means of a musical chord rather than a single sound or note such as a beep sound (see Patent Document 3). With this apparatus, a first musical chord is outputted as indication of start of the operation, and as indication of completion of the operation, a second musical chord different from the first musical chord is outputted. The apparatus also outputs a dissonant chord as a third chord in case the driver's operation for the predetermined operation is found in conflict with the indication.

This Patent Document 3 further discloses a technique according to which the outputting of the first chord as the indication of start is effected intermittently until issuance of the indication of completion, with progressively decreasing the interval between the outputs of the first chord toward the completion.

The above document discloses a still further technique according to which the start of driving operation is indicated with outputting of the dominant chord (G, B, D) relative to the tonic chord (C, E, G) and this dominant chord sound is issued continuously until vehicle's arrival at the vicinity of a predetermined stop position, with progressively reduced intermission interval between the sounds; and upon arrival at the stop position, the tonic chord sound (C, E, G) is issued to give an auditory feeling of completion of the driving operation to the driver.

Further, for the purpose of effectively providing a psychological tension to the driver for his/her dangerous driving by means of an alerting sound providing sense of suspense, there is also proposed a technique of selectively providing different manners of reporting by selectively issuing either a chord sound for providing feeling of security or a chord sound for providing feeling of suspense or tension (see Patent Document 4). This apparatus employs as a musical scale or cord for providing the feeling of security, a scale or chord constituted from a major scale and employs, as the alerting sound for providing the feeling of suspense, a scale or a cord such as a diminish scale or an augmented scale.

PRIOR ART DOCUMENTS

Patent Documents

Patent Document 1: Japanese Patent No. 2689792 (paragraphs 0014-0038, FIG. 2)
Patent Document 2: Japanese Patent No. 2959326 (paragraphs 0021-0026, FIG. 2)
Patent Document 3: Japanese Patent No. 4066698 (paragraphs 0006, 0032-0033, FIG. 1)
Patent Document 4: Japanese Patent Application Publication No. 11-208370 (paragraphs 0006-0041, FIG. 1)

SUMMARY OF THE INVENTION

Problems to be Solved by Invention

In the case of the technique of communicating change in the surrounding or surrounding condition by changing the frequency, volume or alerting interval of alerting sound, the driver is required to memorize the sound before the occurrence of the change and then compare it with the changed sound subsequently issued and recognize this sound distinctly from the previous sound, so instantaneous recognition of the change in the surrounding is difficult. Therefore, while there is no need for the driver to direct the line of sight; due to the need to keep awareness for a certain period of time in an effort to notice any change in the sound, there is the risk of his/her attention to the surrounding becoming insufficient. Further, in the case of such continuous output of sound as above, the driver may find such continued sound per se annoying or noisy. Conversely, the driver may become inadvertently "accustomed" to the sound, which may make the driver insensitive to the direction and the distance of the sound change. Moreover, it is also necessary for the driver to understand in advance the "rule" of how much sound-relating variable parameter varies in accordance with how much change in the surrounding environment. Hence, until satisfactory agreement is established between a sensed sound change and a change in the actual surrounding, the user needs to go through a learning process of using and trying the actual system for a certain period of time. Hence, there is a problem that it takes some time for the user to become accustomed.

As to the method of changing the sound image of the alerting sound as disclosed in Patent Document 1 or Patent Document 2, the method requires changing of the spatial localization of the alerting sound by using a plurality of speakers. As a result, the apparatus as a whole tends to be large in size. Further, due to the special acoustic condition of the interior of an automobile, there is a limit in the accuracy of the spatial localization. Hence, the user can grasp the direction or distance only roughly and instantaneous and accurate communication of the position of a nearby object is difficult. Further, depending on the orientation of the driver's body, there occurs deterioration in the accuracy of the position to be sensed. And, in the case of using simply a beep sound (a sine wave) as the sound source, the discrimination of the sound direction is difficult, so that the user cannot determine instantaneously from which direction the sound is coming. This is another shortcoming.

In the case of the driving assistance apparatus disclosed in Patent Document 3, there is proposed to employ not a single note, but a chord. Assuming both being of a same volume, use of a chord sound can be expected to achieve improvement in the discrimination as compared with use of a single note. However, with the simple arrangement of issuing a plurality of same sound sources as a musical chord at a time, this arrangement cannot always alleviate the driver's psychological stress as compared with the arrangement using a single note. Rather, as a musical chord gives greater recognizability and stronger sensory impression, if it is outputted or "played" for a long time, the driver may find it annoying rather than helpful.

Further, in Patent Document 3, it is proposed to change the tempo of issuing the chord sound or shifting each note in the chord by a half tone or a whole tone. However, with such technique of changing the sound parameter little by little as above, there occurs the same problem as described above as "the driver is required to memorize the sound before the occurrence of change and then compare it with the changed sound subsequently issued, so instantaneous recognition of the change in the surrounding is difficult."

Also, Patent Document 3 further discloses a technique of causing the driver to anticipate completion of a driving operation through utilization of a chord progression from the dominant chord to the tonic chord. Hence, with this technique, there can be expected an impression-enhancing effect for the feeling of completion, called "the dominant motion" based upon the well-known musical theory. However, since the order of issuing the chords is limited to the one-way progression from the dominant chord to the tonic chord, only the dominant chord can be used until arrival of completion. Accordingly, if vehicle stopping takes some time, the same dominant chord sound is to be issued continuously rather long. If the same dominant chord sound is issued too long continuously, exposure to this continued chord sound may result in "dilution" of the memory of the tonic chord as the reference, so that the dominant chord may give a quasi-feeling of chord resolution. As a result, the driver may no longer feel any anticipation of completion (resolution) to the tonic sound.

A vehicle traveling assistance apparatus disclosed in Patent Document 4 employs the method of communicating the feeling of tension by means of a dissonant chord sound or a minor chord sound. However, in a situation of a danger or risk at issue being not established yet, frequent playing of such unpleasant sound will make the driver and/or the passenger feel uncomfortable, and especially this method is not suitable for such application as the cognitive assistance or precaution for un-established danger.

In view of the above-described state of the art, the object of the present invention is to provide a driving assistance apparatus capable of informing progress of a situation to an operational target desired to be achieved eventually, in a simple and effective manner with using a sound suggestively.

Means for Achieving the Object

For accomplishing the above-noted object, with a driving assistance apparatus according to the present invention, the apparatus being provided for assisting for assisting a driving operation by outputting a reverse sound at the time of a reversing maneuver of a vehicle, the apparatus comprises:

an information acquisition unit for acquiring driving assistance information including a vehicle condition and a vehicle surrounding condition;

a reverse sound management unit for managing reverse sounds belonging in a musical scale including the reverse sound as the tonic note thereof as musical scale reverse sounds;

an output reverse sound determination unit for determining a sequence of musical scale in the form of temporal sequence corresponding to the driving assistance information; and a reverse sound output control unit configured to select from the reverse sounds managed by the reverse sound management unit and output to a speaker, reverse sounds suitable for the sequence of the musical scale determined by the reverse sound determination unit.

With the above-described construction, musical scale reverse sounds corresponding to sounds (notes) belonging in a natural major scale or a natural minor scale that includes, as the tonic note thereof, the reverse sound conventionally outputted at the time of a vehicle reversing maneuver are prepared and stored in the reverse sound management unit. Further, the output reverse sound determination unit as an important functional unit for the present invention determines one after another reverse sounds that are to be outputted at the time of vehicle reversing maneuver in accordance with driving assistance information. For this determination, there is employed an algorithm based on the theory of music psychology. The sequence of reverse sounds that are outputted one after another create a so-called "melody". The implication of this melody for the driver corresponds to that of the driving assistance information currently obtained. That is, if the flow (melody) of the reverse sounds is based on the dominant motion from the dominant note to the tonic note in the predetermined scale, the reverse sounds are outputted as the sequence of "G" to "C", thereby to give the feeling of completion, that is, feeling of security to the driver. With this, although the above is an arrangement of simple sequential outputting of reverse sounds, a certain driving condition can be effectively implied to the driver.

Moreover, since the present invention employs, as the other reverse sounds, the other sounds (notes) belonging in the musical scale having the commonly employed reverse sound as the tonic note thereof, the sequence of reverse sounds actually outputted suffers no unnaturalness in its flow (melody) and provides no auditory unpleasantness, either; and as the sounds to be outputted (reverse sounds) are determined based on the theory of musical psychology, the driver can accept instantaneously the sensory (mood) change such as "a change from security to tension" or "a change from tension to security", even without much consciousness. Further, as there is no need for a plurality of speakers or a stereophonic processor system as required for sound image localization, the inventive arrangement above is cost advantageous.

According to one specific characterizing feature of the present invention, said reverse sound output control unit outputs a group of reverse sounds together creating the predetermined temporal sound sequence based on the specified musical scale, by a same cycle and in an intermittent manner. With this arrangement, the reverse sound group as the reverse sound sequence from "G" to "C" that realizes the dominant motion determined based upon predetermined driving assistance information, e.g. information indicative of the vehicle being now entering the optimum parking travel pathway is outputted by a same cycle (by a same interval) and in an intermittent manner. Thus, the arrangement provides a same musical tempo, which hardly gives unnatural feeling to the listener.

According to a further specific characterizing feature of the present invention, said output reverse sound determination unit determines deteriorating tendency or improving tendency of the vehicle condition and the vehicle surrounding condition in accordance with the driving assistance information, such that said output reverse sound determination unit determines the musical scale sequence from the tonic to the subdominant or from the tonic to the dominant in the case of determination of deteriorating tendency and determines the musical scale sequence from the subdominant to the tonic or from the dominant to the tonic in the case of determination of improving tendency. Here, a "deteriorating tendency" refers to tendency of deviating from a certain ideal condition, for instance, a condition of the vehicle deviating from the target traveling line or an obstacle approaching the self vehicle. Whereas, an "improving tendency" refers to tendency of approaching a certain ideal condition, for instance, a condition of the vehicle approaching the target traveling line or an obstacle moving away from the self vehicle.

With the above-described arrangement, the output reverse sound determination unit evaluates a temporal change in the situation of the ongoing vehicle reversing, in accordance with the driving assistance information, and determines whether this change is an improving tendency, a deteriorating tendency or no change condition (a condition of neither an improving tendency nor a deteriorating tendency). For instance, in a reverse parking vehicle run, if a condition is within a speed range assumed by the driving assistance system, this condition is determined as an improving tendency, so that the output reverse sound determination unit creates the sequence of musical scale from the subdominant to the tonic or from the dominant to the tonic, thus causing the driver to feel security. Conversely, if the speed has exceeded such speed range, the unit determines the condition as a deteriorating tendency, so that the unit creates the sequence of musical scale from the tonic to the subdominant, thus causing the driver to feel tension on insecurity. With these, it becomes possible to provide the driver with implication or hint of "feeling of improvement (improving tendency)" that the situation can be left as it is or implication of "feeling of deterioration (deteriorating tendency)" that the situation should not be left as it is. In this, the driver need not learn in advance any special meanings or connotations assigned to the respective reverse sound groups as the temporal sequences of reverse sounds.

According to one preferred embodiment of the present invention, said reverse sound management unit is configured to generate, a normal reverse sound unique to the vehicle as said tonic reverse sound in the particular musical scale and also to generate a dominant reverse sound corresponding to said dominant sound and a subdominant reverse sound corresponding to said subdominant sound, based on sound data of said tonic reverse sound. With this arrangement, the reverse sound normally outputted at the time of reversing of this vehicle is used as the tonic sound as the reference, namely, as the tonic reverse sound. Further, based on the sound data of this tonic reverse sound, there are also generated sound data of a dominant reverse sound and a subdominant reverse sound in a predetermined musical scale including said tonic reverse sound as the tonic thereof and specified by the pitch of this tonic reverse sound. With this arrangement, with the reverse sound outputted normally in this vehicle being as the tonic thereof, a sequence of sounds implying a certain driving assistance information based on the theory of musical psychology relating to this scale is outputted. Therefore, the driver will hardly suffer any unnatural feeling.

Meanwhile, according to another preferred embodiment of the present invention, said vehicle condition and said vehicle surrounding condition employed for determination of what sound sequence the reverse sounds should be outputted comprises conditions directly obtained by a steering angle data, a self vehicle position data, a vehicle speed data and an obstacle detection data, or conditions indirectly obtained from combinations of these data. From these obtained conditions, this driving assistance apparatus can recognize such situation as a deviation of self vehicle speed relative to an assisted speed allowable range to a target parking position, a deviation of a steering angle relative to an ideal pathway to the target parking position, a deviation of self vehicle position relative to an allowable range of parking assistance start position, approaching of an obstacle on a vehicle traveling pathway.

MODES OF EMBODYING THE INVENTION

Figure 1:
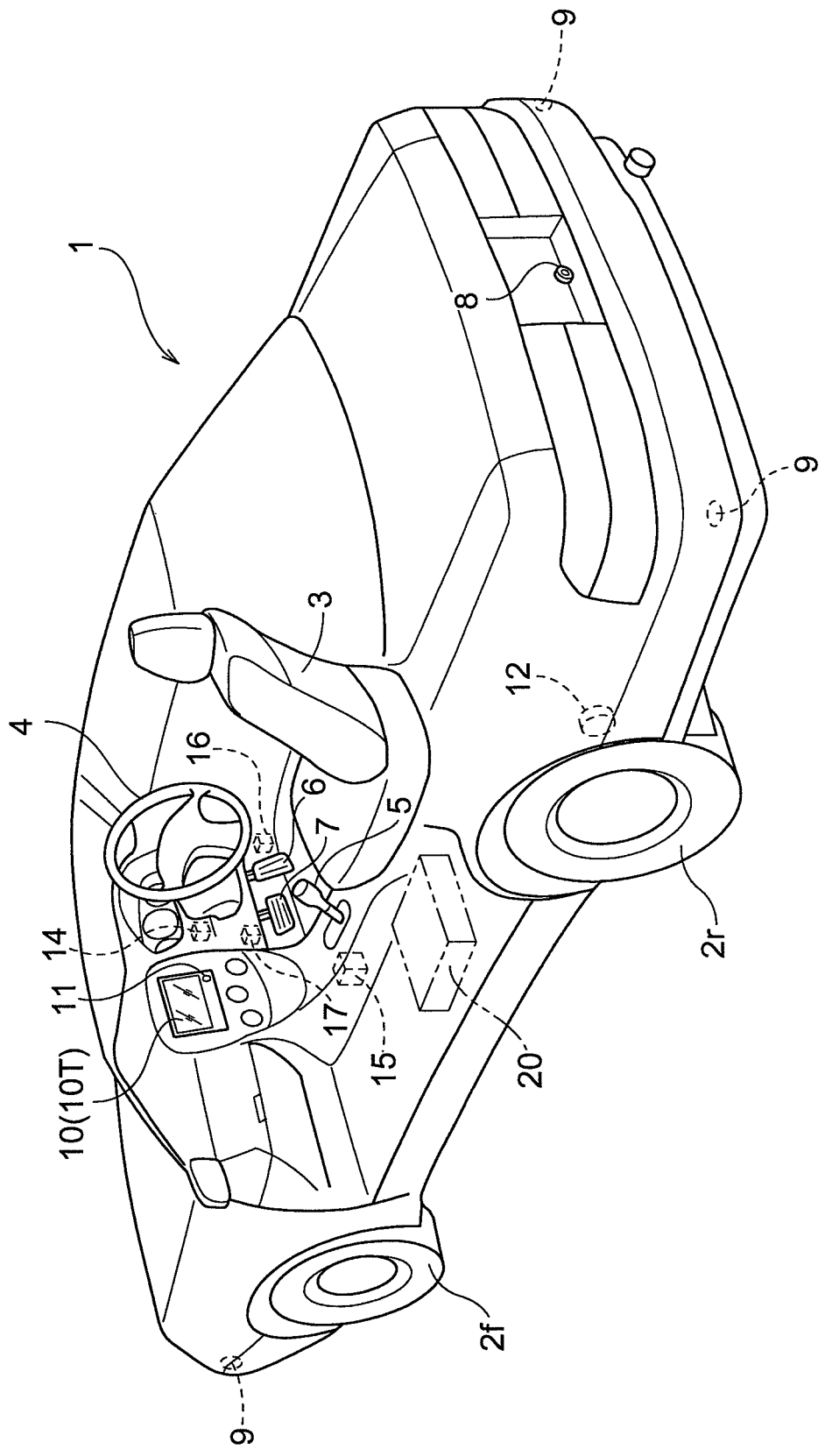
[FIG. 1] is a perspective view showing a vehicle with a portion thereof being cutaway to show its driving seat.

Next, embodiments of a driving assistance apparatus relating to the present invention will be described with reference to the accompanying drawings. FIG. 1 shows the basic construction of a vehicle 1. In the surrounding of a driver's seat 3 thereof, there are arranged a steering wheel 4 for transmitting a rotational operation force to front wheels 2f for effecting a steering operation, a shift lever 5 and an accelerator pedal 6 for controlling the traveling speed, and a brake pedal 7 for applying a braking force to the front wheels 2f and rear wheels 2r. Further, at a position upwardly of a console adjacent the driver's seat 3, there is provided a monitor 10 forming a touch panel 10T in its display face. A speaker 11 is provided adjacent the monitor 10. Incidentally, the speaker 11 can alternatively be mounted in any other vehicle inner face such as the inside of the door. At the rear end of the vehicle 1, there is mounted a rearview camera 8 as an example of vehicle mounted camera for photographing an image of the view of vehicle surrounding. The monitor 10 is constructed as a liquid crystal display having a backlight. Needless to say, the monitor 10 can also be a plasma display type or a CRT type if needed or desired. Further, this monitor is provided with a touch panel so that the monitor outputs a position touched by a finger or the like as a location data. Meanwhile, the monitor 10 is used also as a display device for a navigation system.

The rearview camera 8 is a digital camera that includes an image pickup device such as a CCD (charged coupled device) or CIS (CMOS image sensor) and that outputs obtained information as video information in realtime. The rearview camera 8 mounts a wide-angle lens having a field of view extending for e.g. 140 degrees on the right/left sides respectively and this camera 8 is set with a depression angle of about 30 degrees for instance, so that the camera 8 can cover an area extending about 8 meters rearwardly of the vehicle 1.

The operational line of the steering wheel 4 includes a steering sensor 14 for determining an operation direction and an operation amount of steering. The operational line of the shift lever 5 includes a shift position sensor 15 for determining a shift position. The operational line of the accelerator pedal 6 includes an accelerator sensor 16 for determining its operation amount. The operational line of the brake pedal 7 includes a brake sensor 17 for detecting e.g. presence/absence of its operation.

Further, at appropriate positions of this vehicle 1, at positions of the vehicle rear face, the vehicle side faces and the vehicle front face in this embodiment, there are provided collision alert sensors 9 two for each of the above positions. Each collision alert sensor 9 is comprised of using a millimeter wave radar, an image recognition apparatus, or the like for detecting an obstacle present in the surrounding of the vehicle. Further, as a moved distance sensor, there is provided a rotation sensor 12 for determining a rotation amount of at least one of the front wheels 2f and the rear wheels 2r.

Figure 2:
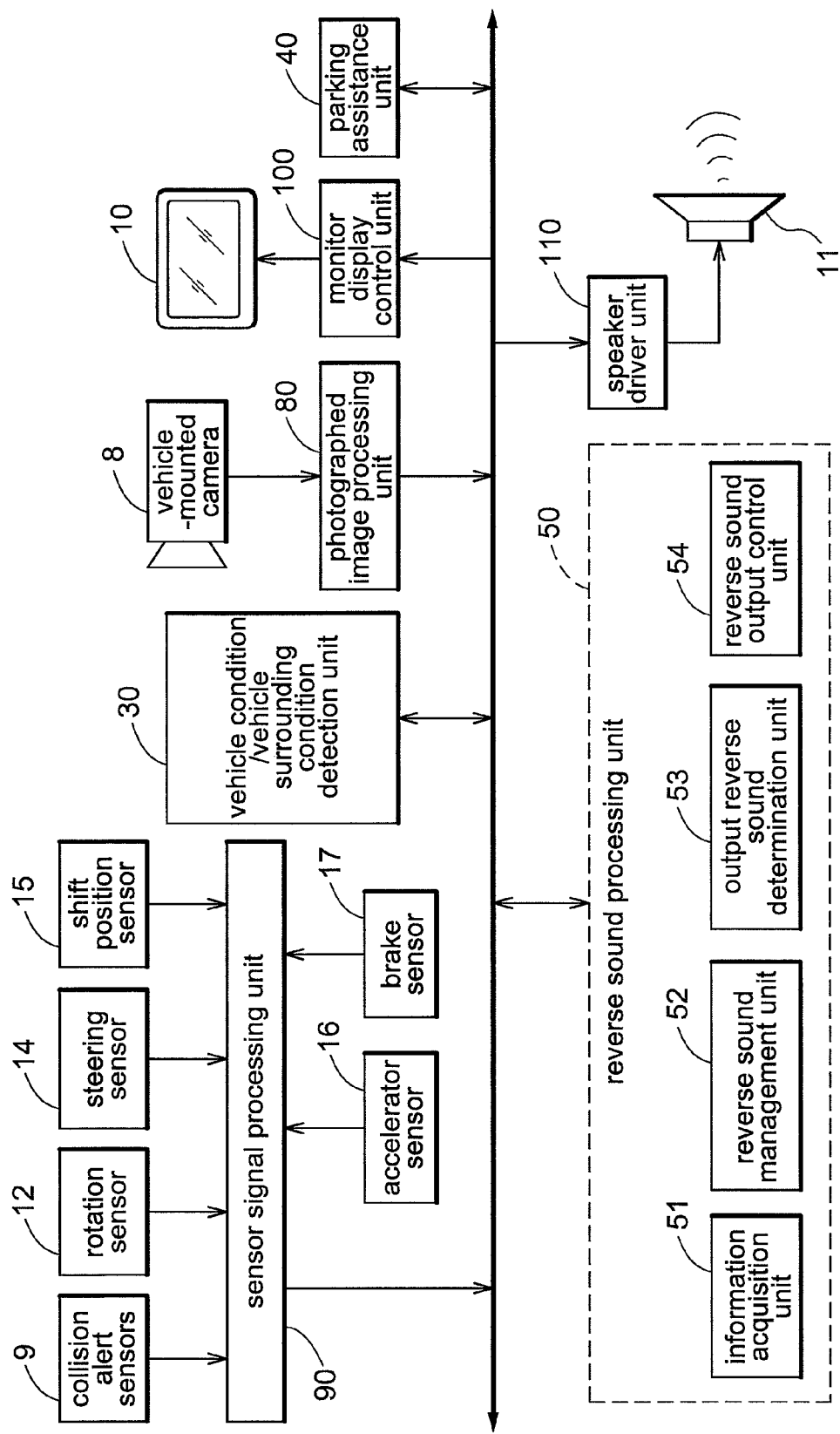
[FIG. 2] is a functional block diagram showing functions of a reverse sound processing unit as an embodiment of the driving assistance apparatus of the present invention and respective functional units in cooperation therewith.

The numeral 20 in the drawing represents an electronic control box incorporating ECUs (electronic control units) for effecting various electronic control operations of the vehicle 1. FIG. 2 shows a block diagram schematically showing the functions of some ECUs that have special relevance to the present invention. Each ECU is comprised with including a computer as the core component thereof and is capable of mutual data transmission through utilization of its network function. In FIG. 2, as such ECUs, there are shown a vehicle condition/vehicle surrounding condition detection unit 30, a parking assistance unit 40, a sensor signal processing unit 90, a photographed image processing unit 80, a monitor display control unit 100, and a reverse sound processing unit 50 as a driving assistance apparatus for assisting a driving operation by outputting a reverse sound at the time of reversing of the vehicle.

The sensor signal processing unit 90 converts signals from the above-described various sensors into data that can be calculated internally and transmits them to respective ECUs requesting such data. Upon receipt of this sensor signal data, each ECU transmits the data generated by its calculation operation as calculated result data to each ECU requesting this data. For instance, in order to recognize the vehicle condition and the vehicle surrounding condition in realtime, the reverse sound processing unit 50 receives a steering angle data and a vehicle speed data from the sensor signal processing unit 90, the automatic driving assistance start position data from the parking assistance unit 40 and the obstacle detection data from the vehicle condition/vehicle surrounding condition detection unit 30.

The vehicle condition/vehicle surrounding condition detection unit 30 has the function of generating information relating to a vehicle condition such as travel data, and a vehicle surrounding condition such as an obstacle detection data, an obstacle tracking data, a traveling pathway data such as a road, a parking lot, etc. For instance, a relative positional relationship between a traveling obstacle requiring caution and the vehicle such as the distance therebetween, is calculated based on sensor signal data from e.g. the collision alert sensors 9 and the possibility of such collision too can be estimated. Needless to say, the photographic image from the camera 8 can be utilized through its image processing, for detection of any object or obstacle of interest. The obstacle detection data generated above will be transmitted to e.g. the parking assistance unit 40 or the reverse sound processing unit 50, etc.

The parking assistance unit 40 per se is known, therefore will not be described herein in details. But, as the functions provided by this parking assistance unit 40, there can be cited a parking assistance image generation function, a parking target position setting function, a guidance function, a moving condition detection function and so on. By the parking assistance image generation function, image information relating to parking assistance is generated and this is displayed on the monitor 10. By the parking target position setting function, the driver can set a target position where the vehicle 1 is to be parked. The guidance function calculates a pathway for guiding maneuver of the vehicle 1 from its current position to the parking target position. The moving condition detection function detects a moving condition of the vehicle 1 moving along the guiding pathway and based upon the result of this detection, a position error during the movement of the vehicle 1 is calculated.

Figure 3:
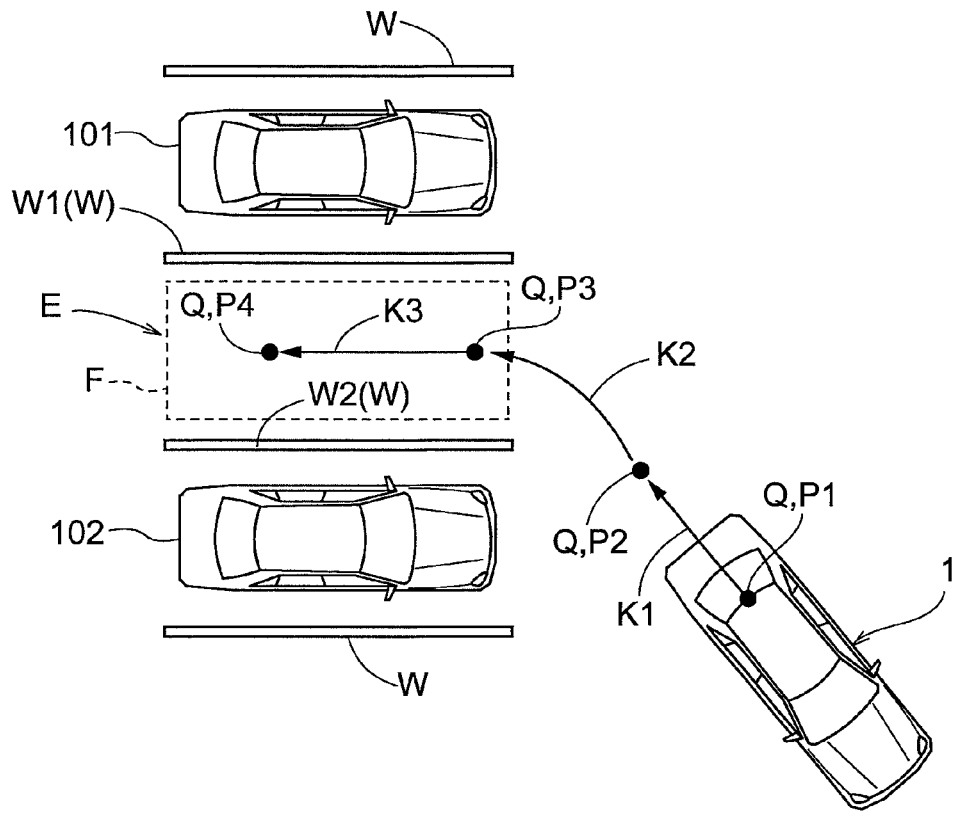
[FIG. 3] is an explanatory view showing a pathway for guiding a vehicle to a parking space.

Next, an example of parking guidance using the above-described parking assistance unit 40 will be explained. FIG. 3 is an explanatory view illustrating a pathway for guiding the vehicle 1 to a parking space. Point Q is a point of reference used in guiding the vehicle 1. In this example, the vehicle 1 is to be parked at a parking stall delimited by parking stall delimiting lines W on the right side relative to the traveling direction. More particularly, in this example, the vehicle 1 is to be parked within the parking stall E delimited by the parking stall delimiting lines W1 and W2. On the opposed sides of this parking stall E, other vehicles 101 and 102 are parked already. A parking target area F is set within the parking stall E. The driver receiving the parking assistance is to maneuver the vehicle 1 past forwardly of the parking stall E and then turn the vehicle 1 to the left and stop the vehicle with the rear side of the vehicle 1 oriented toward the parking target area F. In this, the reference point Q for the vehicle 1 is located at a vehicle position P1. Then, in accordance with guidance by the parking guidance unit 40, the driver will maneuver the vehicle 1 straight rearward until the reference point Q reaches a vehicle position P2 from the vehicle position P1 (path K1). Therefore, the vehicle position P1 is the guidance start position. Next, the driver will reverse the vehicle 1 further with a turn until the reference point Q reaches a vehicle position P3 from the vehicle position P2 by keeping the steering wheel 4 at a predetermined steering angle (path K2). Therefore, the vehicle position P2 is the turn start position and the vehicle position P3 is the turn complete position, respectively. Thereafter, the driver will return the steering wheel 4 to the neutral position so as to maneuver the vehicle 1 straight rearward until the reference point Q reaches a vehicle position P4 from the vehicle position P3 (path K3). Therefore, the vehicle position P4 is the parking target position set based on the parking target area F. When the reference point Q of the vehicle 1 reaches the vehicle position P4, the vehicle 1 is parked within the parking stall E including the parking target area F.

Figure 4:
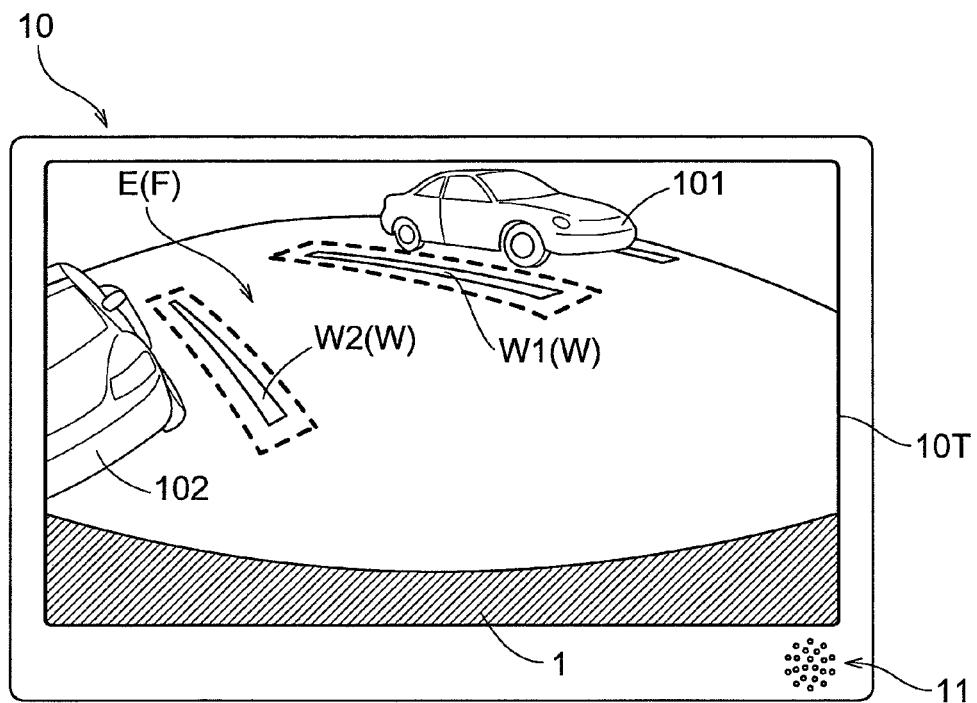
[FIG. 4] is an explanatory view illustrating a method of setting a parking target area from a photographic image obtained by a rearview camera.
Figure 5A:
[FIG. 5A], [FIG. 5B], [FIG. 5C] and [FIG. 5D] are explanatory views illustrating relationship between contents for providing implications to a driver and changes in musical scores representing melodies in one event example at the time of vehicle reversing.
Figure 5:
Figure 5:
Figure 5:

FIG. 4 is an explanatory view illustrating a method of setting a parking target area F at the guidance start position P1 by recognizing a parking stall E from photographic images obtained by the rearview camera 8. As described hereinbefore, the rearview camera 8 is mounted with a depression angle. Therefore, the photographic image includes a rear bumper of the vehicle 1 as well as the road surface (ground surface) rearwardly of the vehicle 1. As also described above, the vehicle 1 is to be stopped at the guidance start position P1 with the rear side of the vehicle oriented toward the parking stall E. Hence, the rearview camera 8 photographs the image of a view including the parking stall E. For instance, through image recognition of the parking stall delimiting lines W1 and W2, the parking stall E is recognized and the parking target area F is set. Upon setting of the parking target area F, the coordinates of the vehicle position P4 will be set as the parking target position. Upon setting of the parking target position P4 and the current guidance start position P1, a pathway for guiding the vehicle 1 to the parking stall E will be calculated. Namely, as explained above with reference FIG. 4, the straight reversing paths K1 and K3 and the turning-involved path K2 are calculated and the coordinates of the vehicle position P2 (turning start position) and the vehicle position P3 (turning complete position) as the points of junction of the respective paths are calculated.

The condition of the steering wheel 4 during reversing is detected by the steering sensor 14 and the moved distance of the vehicle 1 is detected by a rotation sensor 12. Then, based on detection results of these sensors, the coordinates of the reference point Q for the vehicle 1 moving from the coordinates of guidance start position P1 are calculated. Then, the displaying positions of respective parking guides are calculated in correspondence with this reference point Q and the respective parking guides are displayed on the monitor 10. Then, with reference to the parking guides displayed on the monitor 10 as above, the driver will now maneuver the vehicle 1 so as to bring the reference point Q of the vehicle 1 into agreement with the parking target position P4, whereby the parking operation is completed.

For instance, in the course of parking guidance by the parking guidance unit 40 described above, as long as the shift lever 5 is kept at the reversing position, reverse sounds are outputted. In this, the tone of the reverse sounds is same as that of convention, the sequence of these reverse sounds (melody) is based upon the concept of musical psychology. The reverse sound processing unit 50 creates a characteristic sound sequence of reverse sounds in order to give certain particular information to the driver. Therefore, the reverse sound processing unit 50, as shown in FIG. 2, includes an information acquisition unit 51, a reverse sound management unit 52, an output reverse sound determination unit 53 and a reverse sound output control unit 54. The information acquisition unit 51 functions as a driving assistance apparatus for assisting driving by outputting reverse sound at the time of a reversing maneuvering. As driving assistance information to be utilized by this reverse sound processing unit 50, the information acquisition unit 51 receives steering angle data and vehicle speed data from the sensor signal processing unit 90, automatic drive assistance start position data from the parking assistance unit 40, obstacle detection data from the vehicle condition/vehicle surrounding condition detection unit 30, etc. and then, if needed, converts these data into parameter values that can be logically calculated internally and then stores them as variable values of appropriate variables.

The reverse sound management unit 52 manages the standard reverse sound unique to the vehicle as the "tonic reverse sound" functioning as the tonic note of a particular musical scale, and other reverse sounds corresponding to the sounds (tones) belonging in this musical scale having the tonic reverse sound as the tonic note thereof, as "scale reverse sounds". For example, based on sound data of this tonic reverse sound, a dominant reverse sound and a subdominant reverse sound will be generated as the "musical scale reverse sounds".

In this particular embodiment, for the sake of simplicity of explanation, it is assumed the standard reverse sound issued at the time of reversing of this vehicle is the tonic (C5: C) of the natural major scale. Therefore, this tonic (C5: C) is used as the tonic reverse sound. Based on this tonic reverse sound as the reference, the tonic as the basis of tonality, is employed as the "tonic reverse sound". Further, there are generated a dominant reverse sound and a subdominant reverse sound which respectively are the dominant and the subdominant in the scale specified by the pitch of this tonic reverse sound. With this arrangement, together with the reverse sound customarily played and head in this vehicle as the tonic, the sequence of sounds implying certain driving assistance information based on its tonality is outputted. So, the driver will hardly have any feeling of unnaturalness. And, the reverse alert sound management unit 2 manages also the dominant (G5: G) which is the fifth tone, as the dominant reverse sound, the subdominant (F5: F) which is the fourth tone, as the subdominant sound and the subtonic (B5: B) as the subtonic reverse sound and further manages the one octave upper note (C6: C) as the octave tonic reversing alert tone, respectively. This reverse sound management unit 51 can be configured to generate the respective sound data when requested as the management of the respective sound data (reverse sound data) or to generate such data in advance and output them upon request.

The output reverse sound determination unit 53 has an algorithm for determining the sequence of sounds in a particular scale (melody) as a temporal sequence of reverse sounds so that a situation to be communicated to the driver can be psychologically implied (hinted) in accordance with driving assistance information received by the information acquisition unit 51. That is, with use of auditory characteristics that is called "dominant motion" in the musical psychology that progresses from the dominant to the tonic to provide feeling of resolution of security (feeling of completion), it is possible to give the driver the implication of the current vehicle travel being secure and alright. For example, such feeling of security can be provided by the progression from the dominant (dominant reverse sound) to the tonic (tonic reverse sound) or from the dominant (dominant reverse sound) to the octave tonic (octave tonic reverse sound), thereby to provide the implication to continue the current vehicle traveling, advantageously. On the other hand, the progression from the dominant (dominant reverse sound) through the subtonic (subtonic reverse sound) to the octave tonic (octave tonic reverse sound) gives an even greater feeling of security or completion. So, this progression can be suitable for use in implication of completion of reversing parking maneuvering.

On the other hand, the sequence from the tonic (tonic reverse sound) to the subdominant (subdominant reverse sound) not followed by the tonic (tonic reverse sound), that is, absence of dominant motion resolution, gives a feeling of insecurity or undesirable development of situation, so this sequence can be suitably used for implicating the current traveling path being slightly deviated in the course of reversing.

In these ways, it is possible to cause a certain emotion in the driver by means of a stream or sequence of notes (melody) in a particular musical scale based on the music psychology. And, based on this, by creating a temporal sequence of reverse sounds based on a melody for implying the above-described different feeling to the driver, it is also possible to imply to the driver only a change in situation of "the situation being alright or not?" in such case as the parking maneuvering assistance or approaching of a vehicle surrounding obstacle. Therefore, in this mode of embodiment, the output reverse sound determination unit 53 correlates the following vehicle traveling situations with melodies.

(a) Good situation: "Alright": progression from the tonic (tonic reverse sound) to the tonic (tonic reverse sound), that is, repeat of the standard reverse sound.

(b) Change for the worse: "Something wrong?": progression from the tonic (tonic reverse sound) to the subtonic (subtonic reverse sound).

(c) Change for the better: "Keep it up": progression the dominant to the tonic (tonic reverse sound).

(d) Completion "Stop": progression from the dominant (dominant reverse sound) through the subtonic (subtonic reverse sound) to the tonic (tonic reverse sound).

For easier understanding of these melodies, FIG. 5A, FIG. 5B, FIG. 5C and FIG. 5D shows the above in the form of music scores. Meanwhile, as may be understood from the music scores in FIG. 5A, FIG. 5B, FIG. 5C and FIG. 5D, each predetermined reverse sound group is outputted (played) in repetition intermittently by a same cycle. Incidentally, the musical notes in the drawing are representations of the streams of the reverse sounds in the form of musical scores.

The reverse sound output control unit 54 selectively receives reverse sounds determined by the output reverse sound determination unit from the reverse sounds managed by the reverse sound management unit 52 and outputs this reverse sound data to a speaker driver unit 110 for outputting the reverse sounds from the speaker 1 by a predetermined timing (tempo).

Figure 6:
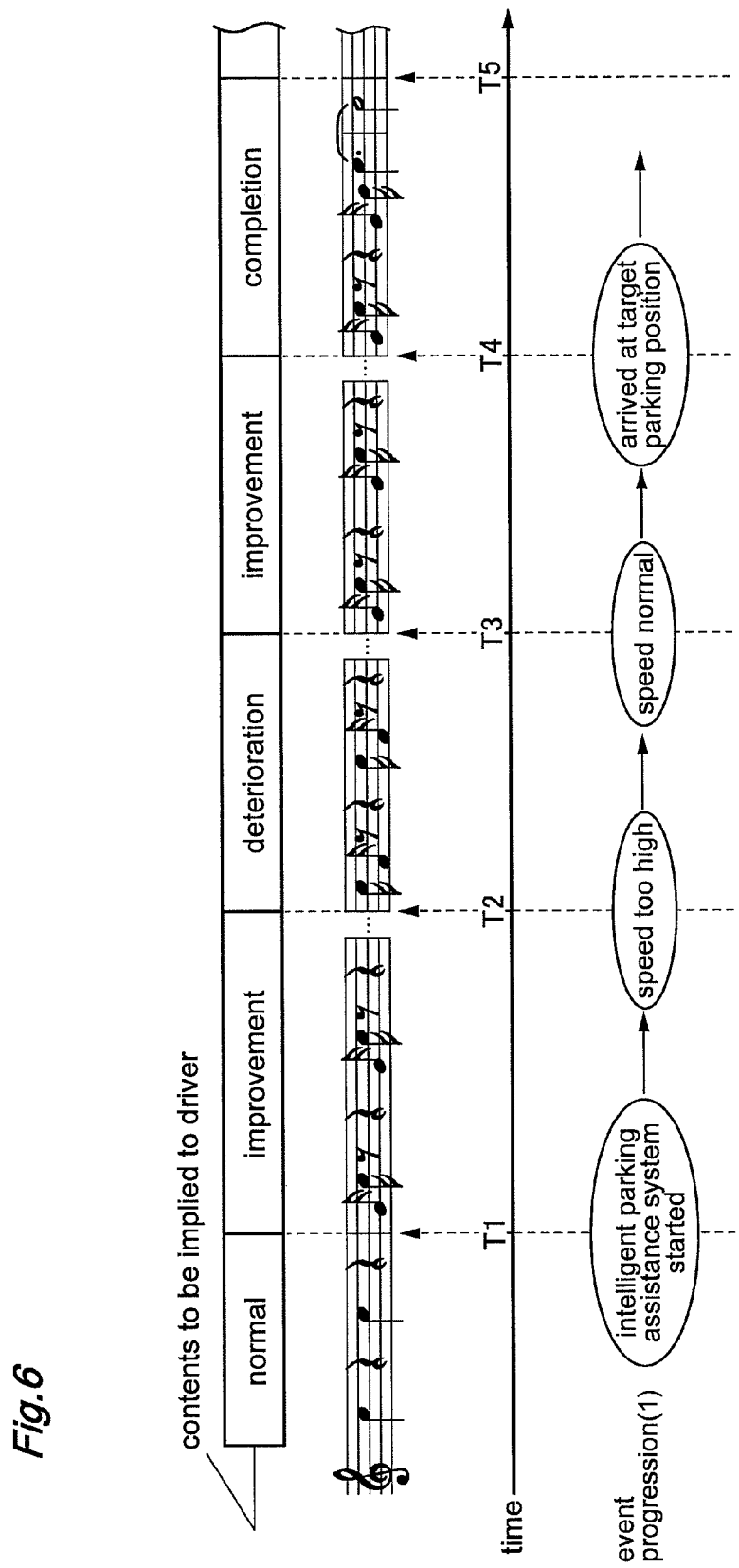
[FIG. 6] is a timing chart schematically showing contents to be implied to the driver and changes in the musical scores representing melodies in a different event example at the time of vehicle reversing.
Figure 7:
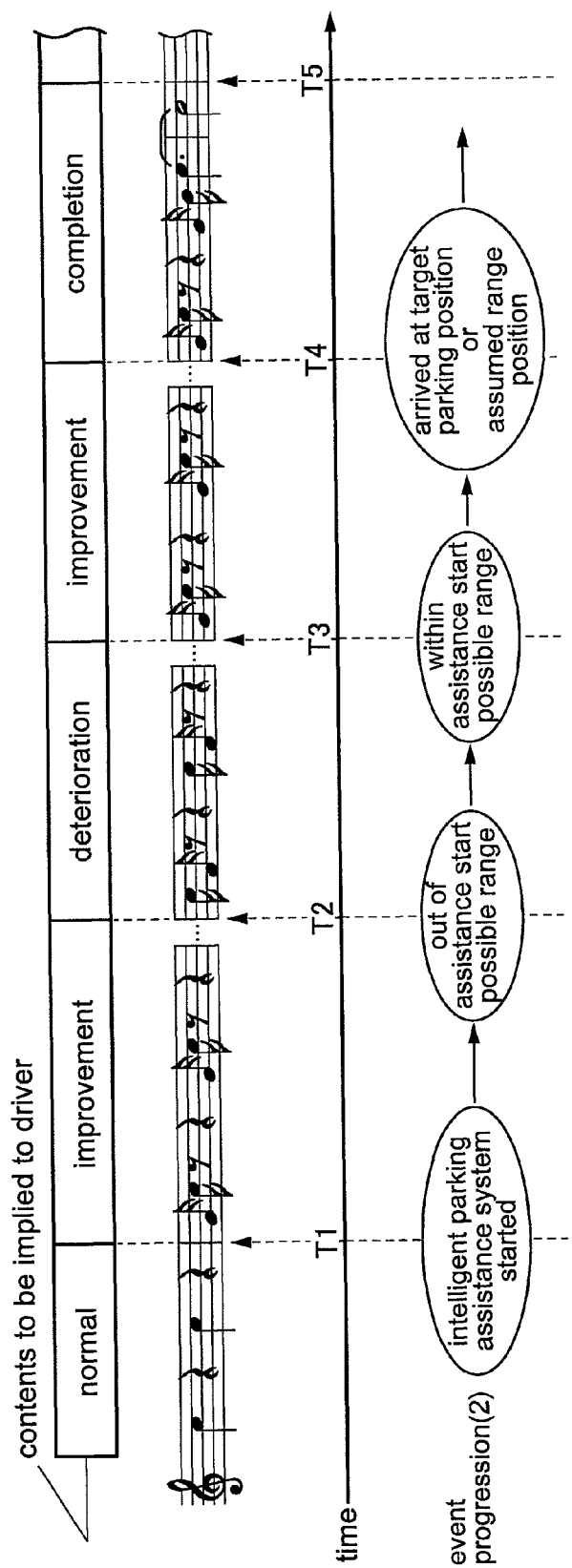
[FIG. 7] is a timing chart schematically showing contents to be implied to the driver and changes in the musical scores representing melodies in a still different event example at the time of vehicle reversing.
Figure 8:
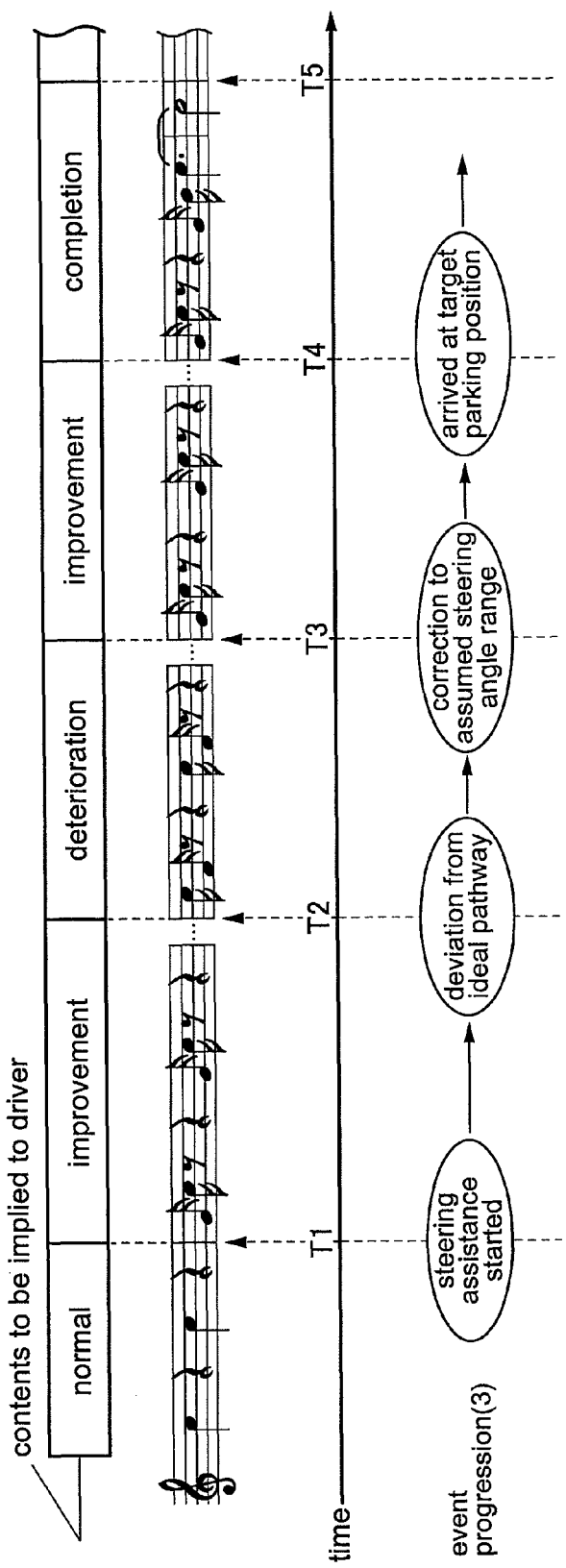
[FIG. 8] is a timing chart schematically showing contents to be implied to the driver and changes in the musical scores representing melodies in a still different event example at the time of vehicle reversing.

Next, with reference to FIG. 6, FIG. 7 and FIG. 8, there will be described the three kinds of event progression at the time of vehicle reversing maneuver and changes of the melodies corresponding to changes in the contents desired to be implied (hinted). FIG. 6, FIG. 7 and FIG. 8 show in the form of timing charts, the changes of the contents desired to be implied to the driver, the music scores of the reverse sound groups outputted from the speaker 11, the time axis, and the sequences of event progression.

The event progression (1) shown in FIG. 6 takes place at the time of maneuvering assistance controlled by a system such as an intelligent parking assistance system configured to assist a driver's parking maneuver through automatic control of the steering angle at the time of parking. In this case, the system implies to the driver whether or not a current self vehicle speed is appropriate relative to a permissible range of assistance speed assumed by the system.

The event progression (2) shown in FIG. 7 takes place at the time of maneuvering assistance controlled by a system such as an intelligent parking assistance system configured to assist a driver's parking maneuver through automatic control of the steering angle at the time of parking. In this case, the system implies to the driver whether or not a current self vehicle position is appropriate relative to a permissible range of assistance speed assumed by the system.

The event progression (3) shown in FIG. 8 takes place at the time of maneuvering assistance controlled by a system such as a parking assistance system for informing the driver of any deviation of a steering angle relative to the optimum pathway to a target parking position or a deviation in the position or the self vehicle, the progression implying (hinting) a deviation in any between the optimum pathway and the current steering angle.

Next, regarding the respective event progressions shown in FIG. 6, FIG. 7 and FIG. 8, there will be explained changes in the contents desired to be implied to the driver and the changes in melodies corresponding to the changes in the contents to be implied, common to all these progressions. Firstly, the tonic reverse sound, which is the standard reverse sound of the vehicle, is played in repetition.

Next, at timing T1, in the cases of event progressions (1) and (2), the intelligent parking assistance system is activated, whereas in the case of event progression (3), the steering assistance is started. And, from this timing T1, the system determines the melody from the dominant to the tonic, hinting improvement and the reversing alert notes corresponding to this melody are played.

In succession, at timing T2, in the case of event progression (1), "current speed being excessive" is detected. In the case of event progression (2), "the self vehicle position being out of the assistance start allowable range" is detected. In the case of event progression (3), "presence of deviation in the steering angle relative to the ideal pathway" is detected. Therefore, from this timing T2, the system determines the melody from the tonic to the subtonic hinting deterioration, and the reversing alert notes corresponding to this melody are played.

Further, at timing T3, in the case of event progression (1), "the current vehicle speed being normal" is detected. In the case of event progression (2), "the self vehicle position being now back within the assistance start allowable range" is detected. In the case of event progression (3), "the steering angle being now corrected to the assumed steering angle range" is detected. Therefore, from this timing T3, the system determines again the melody from the dominant to the tonic implying improvement, and the reversing alert notes corresponding to this melody are played.

Further, at timing T4, in the case of event progression (1), "the self vehicle having reached the target parking position" is detected. In the case of event progression (2), "the self vehicle position having reached the target parking position or the assumed range position" is detected. In the case of event progression (3), "the steering angle having been corrected to the assumed steering angle range" is detected. Therefore, from this timing T4, the system determines the melody from the dominant through the subtonic to the tonic hinting completion, and the reversing alert notes corresponding to this melody are played. After the reverse sound group implying completion is played by a predetermined times until timing T5, the standard reverse sound will be played in repetition until the shift lever is moved away from the reverse position.

Further, though not described with reference to any illustration, it is also possible to imply an approaching situation of an obstacle to the driver with selective use of "deterioration" and "improvement" in accordance with an approaching situation of an obstacle present on a traveling pathway of the vehicle.

In this way, with the driving assistance apparatus according to the present invention, the apparatus creates a stream or sequence of sounds (a melody) in a particular musical scale so that a situation to be communicated to the driver may be implied or hinted to the driver in the musical psychological way. Thus, it is possible to imply a change in the situation to the driver almost unconsciously for this driver. Further, as the use of the combination with a higher note having good musical affinity, the communication or implying can be done without causing much audible unpleasantness. Consequently, the apparatus can notify the driver of a situation change that takes a long time from an unfavorable situation such as "deterioration" to "improvement", without casing much unpleasantness or bothering for the driver. And, as the reverse sounds to be outputted therefor are familiar sounds for the driver, with changing only in the pitches over time. Therefore, even if exposed to them for an extended period of time, the driver will suffer no feeling of unnaturalness and it is possible to notify the driver at an early timing before materialization of the dangerous situation, the danger becoming reality.

Other Embodiments (1) In the foregoing embodiment, the reversing alarm sound group consists of single notes. Instead, this can be comprised of a tonic chord or a broken chord (an arpeggio).

(2) It is possible to arrange such that the tone of the reverse sound acting as the "base note", may be freely selected. In that case, the dominant, the subdominant, the subtonic, etc. will be prepared relative to the selected reversing alert tone as the tonic.

(3) In the foregoing embodiment, the stream of music scale created by the group of reverse sounds is expressed as a melody. However, the present invention is not limited to the arrangement of implying in a musical psychological way a situation to be communicated to the driver by means of a melody. For instance, the scope of the invention is understood to be inclusive of such other arrangements as changing the speed of the scale notes, that is, tempo of the music according to the situation to be communicated or changing the music rhythm created by the durations of the respective tones representing the respective reverse sounds according to the situation to be communicated to the driver. That is, the technical concept of a stream of musical scale determined by the output reverse sound determination unit is understood to be inclusive of not only a melody in a particular musical scale, but also the tempo and rhythm

INDUSTRIAL APPLICABILITY

The present invention is applicable to the field of driving assistance for reporting, in the form of psychological implying, an ongoing situation in a vehicle drive to the driver with using sound.

DESCRIPTION OF REFERENCE MARKS/NUMERALS

8 rearview camera
10 monitor
11 speaker
40 parking assistance unit
50 reverse sound processing unit (driving assistance apparatus)
51 information acquisition unit
52 reverse sound management unit
53 output reverse sound determination unit
54 reverse sound output control unit

The invention claimed is:

1. A driving assistance apparatus for assisting a driving operation by outputting a reverse sound at the time of a reversing maneuver of a vehicle, the apparatus comprising:
   an information acquisition unit for acquiring driving assistance information including a vehicle condition and a vehicle surrounding condition;
   a reverse sound management unit for managing reverse sounds belonging in a musical scale including the reverse sound as the tonic note thereof as musical scale reverse sounds;
   an output reverse sound determination unit for determining a sequence of musical scale in the form of temporal sequence corresponding to the driving assistance information; and
   a reverse sound output control unit configured to select from the reverse sounds managed by the reverse sound management unit and output to a speaker, reverse sounds suitable for the sequence of the musical scale determined by the reverse sound determination unit.

2. The driving assistance apparatus according to claim 1, wherein said reverse sound output control unit outputs a group of reverse sounds together creating the predetermined temporal sound sequence based on the specified musical scale, by a same cycle and in an intermittent manner.

3. The driving assistance apparatus according to claim 1, wherein said output reverse sound determination unit determines deteriorating tendency or improving tendency of the vehicle condition and the vehicle surrounding condition in accordance with the driving assistance information, such that said output reverse sound determination unit determines the musical scale sequence from the tonic to the subdominant or from the tonic to the dominant in the case of determination of deteriorating tendency and determines the musical scale sequence from the subdominant to the tonic or from the dominant to the tonic in the case of determination of improving tendency.

4. The driving assistance apparatus according to claim 3, wherein said reverse sound management unit is configured to generate, a normal reverse sound unique to the vehicle as said tonic reverse sound in the particular musical scale and also to generate a dominant reverse sound corresponding to said dominant sound and a subdominant reverse sound corresponding to said subdominant sound, based on sound data of said tonic reverse sound.

5. The driving assistance apparatus according to claim 1, wherein said vehicle condition and said vehicle surrounding condition comprises conditions directly obtained by a steering angle data, a self vehicle position data, a vehicle speed data and an obstacle detection data, or conditions indirectly obtained from combinations of these data.

* * * * *